US012748371B2

(12) United States Patent
Tawada et al.

(10) Patent No.: US 12,748,371 B2
(45) Date of Patent: Sep. 29, 2026

(54) IMAGE FORMING APPARATUS

(71) Applicants: Takaaki Tawada, Kanagawa (JP); Shotaro Hoshi, Kanagawa (JP); Kazuhiko Watanabe, Kanagawa (JP); Hirofumi Fujii, Kanagawa (JP)

(72) Inventors: Takaaki Tawada, Kanagawa (JP); Shotaro Hoshi, Kanagawa (JP); Kazuhiko Watanabe, Kanagawa (JP); Hirofumi Fujii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/796,857

(22) Filed: Aug. 7, 2024

(65) Prior Publication Data

US 2025/0085656 A1 Mar. 13, 2025

(30) Foreign Application Priority Data

Sep. 12, 2023 (JP) ................................ 2023-147528

(51) Int. Cl.
*G03G 15/00* (2006.01)
*G03G 15/01* (2006.01)
*G03G 15/16* (2006.01)

(52) U.S. Cl.
CPC ..... *G03G 15/5054* (2013.01); *G03G 15/0131* (2013.01); *G03G 15/0189* (2013.01); *G03G 15/161* (2013.01)

(58) Field of Classification Search
CPC ............. G03G 15/161; G03G 15/1615; G03G 15/0131; G03G 15/0189; G03G 15/50;
(Continued)

(56) References Cited

U.S. PATENT DOCUMENTS 9,835,999 B2 * 12/2017 Tsuda ..................... G03G 15/50
2006/0024076 A1 * 2/2006 Kato ................. G03G 15/0131
399/302

(Continued)

FOREIGN PATENT DOCUMENTS

JP 2011-227207 A 11/2011
JP 2017-015807 A 1/2017
JP 2023-029257 A 3/2023

OTHER PUBLICATIONS

U.S. Appl. No. 18/566,291, filed Dec. 1, 2023.

*Primary Examiner* — Carla J Therrien
(74) *Attorney, Agent, or Firm* — Harness, Dickey & Pierce, P.L.C.

(57) ABSTRACT

An image forming apparatus includes an image forming unit, an image bearer movable in a moving direction, a transferor, a cleaner, a sensor, and circuitry. The circuitry controls the image forming unit to form multiple toner patches arranged at a first interval on the image bearer in an orthogonal direction orthogonal to the moving direction and controls the sensor to detect the multiple toner patches. The circuitry adjusts the image forming unit based on a detection of the multiple toner patches by the sensor as an adjustment operation. The circuitry is configured to separate the transferor from the image bearer during the adjustment operation and control the image forming unit to form multiple patterns arranged at a second interval in the moving direction. Each of the multiple patterns has a band shape extending in the orthogonal direction.

16 Claims, 5 Drawing Sheets

(58) Field of Classification Search
CPC ........... G03G 15/5008; G03G 15/5054; G03G 15/5058; G03G 2215/1661
See application file for complete search history.

(56) References Cited

U.S. PATENT DOCUMENTS

| | | | | |
|---|---|---|---|---|
| 2007/0116483 | A1* | 5/2007 | Kobayashi | G03G 15/0131 399/346 |
| 2007/0122210 | A1* | 5/2007 | Sato | G03G 21/0011 399/301 |
| 2007/0217801 | A1* | 9/2007 | Tsuboi | G03G 15/0131 399/49 |
| 2009/0087206 | A1* | 4/2009 | Koide | G03G 15/161 399/71 |
| 2011/0013959 | A1* | 1/2011 | Thayer | G03G 21/0005 399/346 |
| 2014/0270839 | A1* | 9/2014 | Matsumoto | G03G 15/168 399/101 |
| 2014/0340457 | A1* | 11/2014 | Hashimoto | G03G 21/0011 347/118 |
| 2014/0348521 | A1 | 11/2014 | Mase et al. | |
| 2015/0117884 | A1 | 4/2015 | Sugiyama et al. | |
| 2021/0333725 | A1* | 10/2021 | Nakamoto | G03G 15/1615 |
| 2023/0056875 | A1 | 2/2023 | Hoshi et al. | |
| 2024/0272570 | A1* | 8/2024 | Hoshi | G03G 15/161 |
| 2024/0280933 | A1* | 8/2024 | Kobayashi | G03G 15/5041 |
| 2025/0076805 | A1* | 3/2025 | Watanabe | G03G 15/5054 |

* cited by examiner

FIG. 7
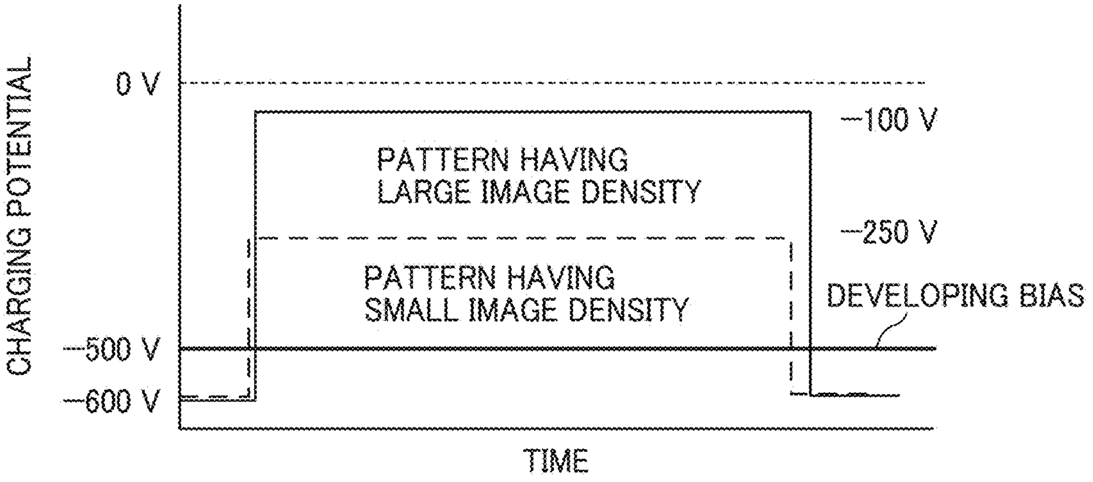
FIG. 8A
FIG. 8B
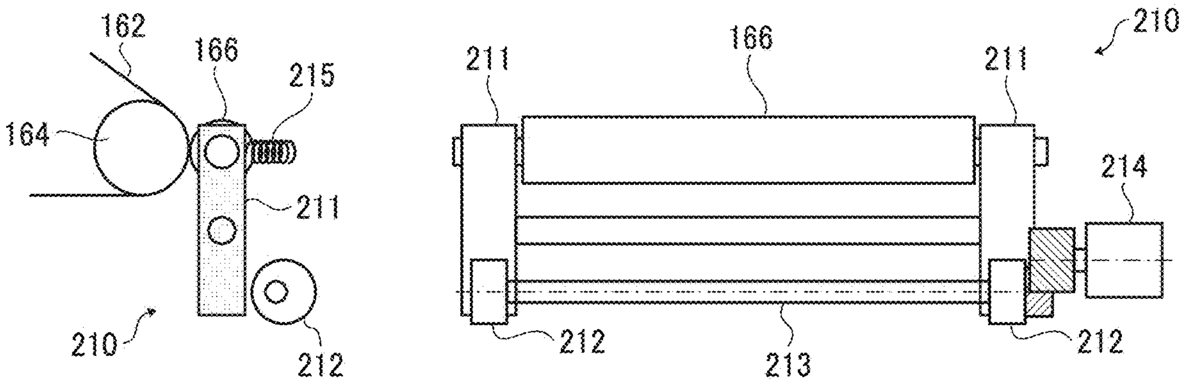
FIG. 9
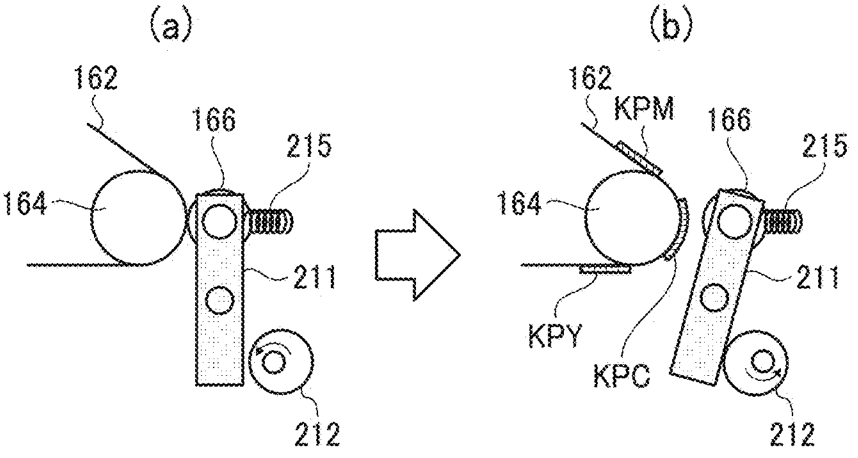

IMAGE FORMING APPARATUS

CROSS-REFERENCE TO RELATED APPLICATION

This patent application is based on and claims priority pursuant to 35 U.S.C. § 119(a) to Japanese Patent Application No. 2023-147528, filed on Sep. 12, 2023, in the Japan Patent Office, the entire disclosure of which is hereby incorporated by reference herein.

BACKGROUND

Technical Field

Embodiments of the present disclosure relate to an image forming apparatus.

Related Art

An image forming apparatus in the related art includes an image forming device, an image bearer, a transferor, a cleaner, a pattern detector, and a controller. The image forming device forms a toner image on the image bearer. The image bearer bears the toner image. The transferor transfers the toner image from the image bearer to a recording medium. The cleaner cleans a surface of the image bearer. The controller controls the image forming device to form an adjustment pattern on the image bearer. The adjustment pattern includes multiple toner patches arranged at intervals in a direction orthogonal to a direction in which the image bearer moves. The pattern detector detects the adjustment pattern. Based on results detected by the pattern detector, the controller performs an adjustment operation to adjust the image forming device.

SUMMARY

This specification describes an improved image forming apparatus that includes an image forming unit, an image bearer, a transferor, a cleaner, a sensor, and circuitry. The image forming unit forms a toner image. The image bearer contacts the image forming unit to bear the toner image. The image bearer is movable in a moving direction. The transferor contacts the image bearer to transfer the toner image from the image bearer to a recording medium. The cleaner contacts the image bearer to clean the surface of the image bearer. The circuitry is configured to control the image forming unit to form multiple toner patches arranged at a first interval on the image bearer in an orthogonal direction orthogonal to the moving direction and control the sensor to detect the multiple toner patches. The circuitry is configured to adjust the image forming unit based on a detection of the multiple toner patches by the sensor as an adjustment operation. The circuitry is configured to separate the transferor from the image bearer during the adjustment operation and control the image forming unit to form multiple patterns arranged at a second interval in the moving direction. Each of the multiple patterns has a band shape extending in the orthogonal direction.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 7 is a graph to illustrate how to change an image density of a scraping pattern;

FIGS. 8A and 8B are schematic diagrams illustrating a configuration of a contact and separation mechanism to separate a secondary transfer roller from an intermediate transfer belt; and FIG. 9 is schematic diagrams illustrating operations of the contact and separation mechanism illustrated in FIGS. 8A and 8B.

Figure 1:
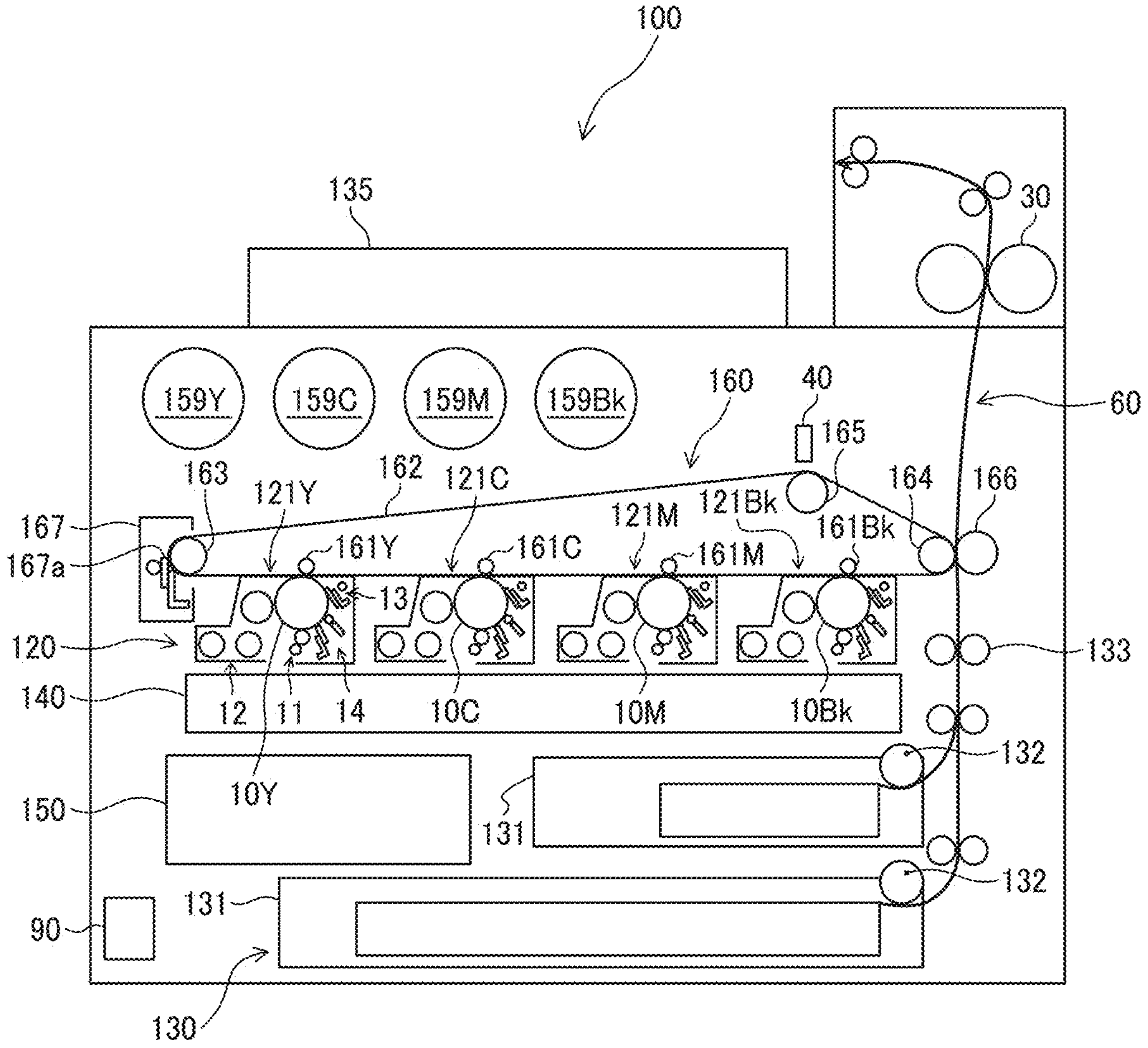
FIG. 1 is a schematic diagram illustrating a configuration of a printer according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the accompanying drawings. Note that it is easy for a person skilled in the art to modify or amend the present disclosure within the scope of the claims to form another embodiment, and these modifications or amendments are included in the scope of the claims. The following description is an example of the best mode of the present disclosure and does not limit the scope of the claims.

The following describes an electrophotographic printer as an image forming apparatus according to an embodiment of the present disclosure. In the following description, the electrophotographic printer is referred to as a printer 100.

FIG. 1 is a schematic diagram illustrating a configuration of the printer 100.

The printer 100 is a tandem type full color image forming apparatus that forms a color image using yellow (Y) toner, cyan (C) toner, magenta (M) toner, and black (Bk) toner. The printer 100 includes an image forming section 120, an intermediate transfer section 160, and a sheet feed section 130. In the following descriptions, suffixes Y, M, C, and Bk of reference numerals indicate members corresponding to colors of yellow, magenta, cyan, and black, respectively.

The sheet feed section 130 is in a lower portion of the printer 100 and includes two sheet trays 131 each storing sheets as recording media. The image forming section 120 and the intermediate transfer section 160 are disposed above the sheet feed section 130 in the printer 100.

The image forming section 120 includes four image forming units 121Y, 121C, 121M, and 121Bk including drum-shaped photoconductors 10Y, 10C, 10M, and 10Bk, respectively. The image forming units 121Y, 121C, 121M, and 121Bk are arranged in a moving direction of an intermediate transfer belt 162 in which the surface of the intermediate transfer belt 162 serving as an image bearer moves and are configured as process cartridges that are integrally attachable to and detachable from the printer 100.

Each of the image forming units 121Y, 121C, 121M, and 121Bk includes a charging device 11, a developing device 12, a photoconductor cleaner 13, and a lubrication device 14.

The intermediate transfer section 160 includes the intermediate transfer belt 162, primary transfer rollers 161Y, 161C, 161M, and 161Bk, and a secondary transfer roller 166 as a transferor. The intermediate transfer belt 162 is a flexible endless belt wound around multiple support rollers and serves as the image bearer. The intermediate transfer belt 162 is disposed above the image forming units 121Y, 121C, 121M, and 121Bk, and the photoconductors 10Y, 10C, 10M, and 10Bk in the image forming units 121Y, 121C, 121M, and 121Bk are in contact with the intermediate transfer belt 162. The surface of the intermediate transfer belt 162 moves in synchronization with the movement of the surfaces of the photoconductors 10Y, 10C, 10M, and 10Bk. The primary transfer rollers 161Y, 161C, 161M, and 161Bk are arranged along the inner circumferential surface of the intermediate transfer belt 162 and press the inner circumferential surface of the intermediate transfer belt 162 against the photoconductors 10Y, 10C, 10M, and 10Bk so that the surface of the intermediate transfer belt 162 contacts the surfaces of the photoconductors 10Y, 10C, 10M, and 10Bk.

The multiple support rollers around which the intermediate transfer belt 162 is wound include a driving roller 163 disposed on the left part of the loop of the intermediate transfer belt 162 in FIG. 1, an opposed roller 164 disposed on the right part of the loop of the intermediate transfer belt 162 in FIG. 1 to face the secondary transfer roller 166, a driven roller 165 disposed on the upper part of the loop of the intermediate transfer belt 162 in FIG. 1, and primary transfer rollers 161Y, 161C, 161M, and 161Bk.

The secondary transfer roller 166 serving as a secondary transfer device is disposed around the intermediate transfer belt 162 at a position on a sheet conveyance path 60 so as to face the opposed roller 164. A belt cleaning device 167 faces the driving roller 163 and cleans the surface of the intermediate transfer belt 162.

Toner bottles 159Y, 159C, 159M, and 159Bk corresponding to the image forming units 121Y, 121C, 121M, and 121Bk are arranged substantially horizontally above the intermediate transfer section 160. An exposure device 140 is disposed below the image forming units 121Y, 121C, 121M, and 121Bk. The exposure device 140 irradiates the surfaces of the uniformly charged photoconductors 10Y, 10C, 10M, and 10Bk with laser light to form electrostatic latent images.

The sheet feed section 130 is disposed below the exposure device 140. The sheet feed section 130 includes the sheet trays 131 to store sheets as recording media and feed rollers 132.

The sheet feeding section 130 feeds a sheet toward a secondary transfer nip between the intermediate transfer belt 162 and the secondary transfer roller 166 via a registration roller pair 133 at a predetermined timing.

A waste toner bottle 150 is also disposed below the exposure device 140 to store waste toner removed by the photoconductor cleaner 13 and the belt cleaning device 167.

A fixing device 30 is disposed downstream from the secondary transfer nip in a sheet conveyance direction to fix a toner image onto the sheet. A sheet ejection section 135 is disposed downstream from the fixing device 30 in the sheet conveyance direction. The sheet ejection section 135 includes an output roller pair and stores sheets ejected.

The sheet conveyance path 60 for conveying a sheet is formed from the two sheet trays 131 in the sheet feed section 130 to the fixing device 30. The printer 100 includes a controller 90 as circuitry including a central processing unit (CPU), a random-access memory (RAM), and a read-only memory (ROM). The controller 90 controls the above-described devices and components to perform various operations.

In the printer 100, the charging devices 11 uniformly charge the photoconductors 10Y, 10C, 10M, and 10Bk in the image forming units 121Y, 121C, 121M, and 121Bk, and yellow, cyan, magenta, and black color images are exposed to the photoconductors 10Y, 10C, 10M, and 10Bk by the exposure device 140 to form electrostatic latent images on the photoconductors 10Y, 10C, 10M, and 10Bk. Subsequently, the developing devices 12 supply yellow, cyan, magenta, and black toners to the surfaces of the photoconductors 10Y, 10C, 10M, and 10Bk to develop the electrostatic latent images on the photoconductors, respectively. The developed yellow, cyan, magenta, and black toner images on the photoconductors reach primary transfer nips at which the intermediate transfer belt 162 contacts photoconductors. The yellow, cyan, magenta, and black toner images are sequentially primarily transferred and superimposed onto the intermediate transfer belt 162 to form a color toner image.

Transfer residual toner that has not been primarily transferred to the intermediate transfer belt 162 remains on the surface of the photoconductor, and the photoconductor cleaner 13 removes the transfer residual toner from the surface of the photoconductor. The transfer residual toner removed by the photoconductor cleaner 13 is conveyed to and collected in the waste toner bottle 150 as waste toner via a conveyance passage. Subsequently, the lubrication device 14 applies lubricant to the surface of the photoconductor.

The color toner image on the intermediate transfer belt, onto which the yellow, cyan, magenta, and black toner images are sequentially primarily transferred from the photoconductors and superimposed is conveyed to the secondary transfer nip formed by the secondary transfer roller 166 in contact with the intermediate transfer belt. The sheet is conveyed from any one of the sheet trays 131 to the secondary transfer nip via the registration roller pair 133. The color toner image on the intermediate transfer belt is secondarily transferred onto the sheet at the secondary transfer nip.

A secondary transfer bias is applied to an opposed roller 164 facing the secondary transfer roller 166 via the intermediate transfer belt 162. The secondary transfer roller 166 is electrically grounded. When the color toner image on the intermediate transfer belt 162 is secondarily transferred onto the sheet P, a transfer bias having a negative polarity, which is a normal charging polarity of the toner, is applied to the opposed roller 164 so that the normally charged toner having the negative polarity on the intermediate transfer belt 162 is repulsively transferred onto the sheet P.

Transfer residual toner that has not been secondarily transferred to the sheet remains on the intermediate transfer belt 162, and a cleaning blade 167*a* as a cleaner in the belt cleaning device 167 removes the transfer residual toner from the intermediate transfer belt 162. The toner removed by the cleaning blade 167*a* is conveyed to and collected in the waste toner bottle 150 as waste toner via the conveyance passage.

The controller 90 in the printer 100 performs control called process control as an adjustment operation at a given point in time to keep the image quality stable over time or even when the environment changes.

Figure 2:
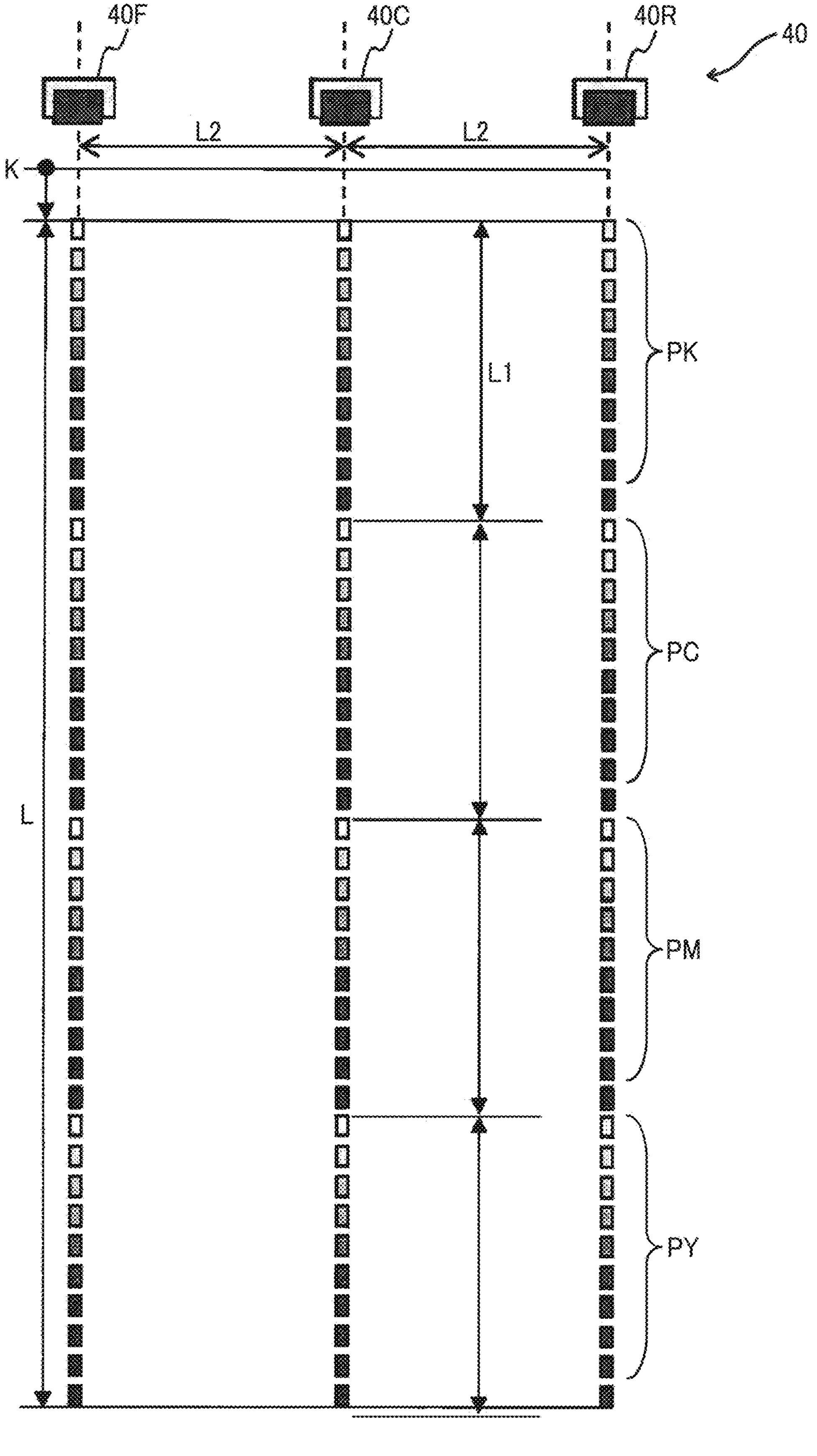
FIG. 2 is a schematic diagram illustrating gradation patterns as the adjustment pattern on an intermediate transfer belt.

FIG. 2 is a schematic diagram illustrating gradation patterns as the adjustment pattern on the intermediate transfer belt. The controller 90 controls the image forming units 121Y, 121C, 121M, and 121Bk and the exposure device 140 to form the gradation patterns as illustrated in FIG. 2 on the intermediate transfer belt 162 as the image bearer.

The gradation pattern as the adjustment pattern includes multiple toner patches arranged in a width direction of the intermediate transfer belt 162 that is also a main scanning direction, and multiple toner patches are also arranged in the moving direction of the intermediate transfer belt 162 that is also a sub-scanning direction. Specifically, the printer 100 includes optical sensors 40R, 40C, and 40F as pattern detectors arranged in the width direction of the intermediate transfer belt that is orthogonal to the moving direction of the intermediate transfer belt. The optical sensors 40R and 40F are disposed to face both ends of the intermediate transfer belt in the width direction, and the optical sensor 40C is disposed to face the center of the intermediate transfer belt in the width direction. The controller 90 controls the image forming units and the exposure device to form three toner patches at the center and both ends of the intermediate transfer belt in the width direction of the intermediate transfer belt at predetermined intervals so as to face the optical sensors 40C, 40R, and 40F and have the same image density. In the moving direction of the intermediate transfer belt, the controller 90 controls the image forming units and the exposure device to form toner patches having different image densities and arranged in the moving direction. In the example illustrated in FIG. 2, gradation patterns PK, PC, PM, and PY for black, cyan, magenta, and yellow, respectively, are formed from the top.

An optical sensor device 40 includes the optical sensors 40R, 40C, and 40F as multiple pattern detectors aligned at given intervals in the width direction of the intermediate transfer belt 162. Each of the optical sensors 40R, 40C, and 40F outputs a signal corresponding to the light reflectance of the intermediate transfer belt 162 or the toner patches of the gradation patterns PK, PC, PM, and PY on the intermediate transfer belt 162, thus detecting a toner adhesion amount, which is an amount of toner adhering to the intermediate transfer belt 162. The controller 90 in the printer 100 adjusts an image forming condition such as a developing bias based on the detected toner adhesion amount.

The optical sensors 40R and 40F facing both ends of the intermediate transfer belt 162 in the width direction of the intermediate transfer belt 162 are disposed outside a sheet conveyance area as a recording medium conveyance area of the intermediate transfer belt 162. As in FIG. 3, during formation of a toner image to be transferred to the sheet, the printer 100 forms the image adjustment patterns outside the sheet conveyance area and detect, with the optical sensors 40R and 40F, the toner adhesion amounts of the image adjustment patterns. Based on the toner adhesion amounts detected by the optical sensors 40R and 40F, the controller 90 adjusts the developing bias to adjust the image density, for example.

The secondary transfer roller 166 is configured to be attachable to and detachable from the intermediate transfer belt 162. In other words, the printer 100 includes a contact and separation mechanism 210 that moves the secondary transfer roller to come into contact with or separate from the intermediate transfer belt 162. During the process control, the controller 90 controls the contact and separation mechanism 210 to separate the secondary transfer roller 166 from the intermediate transfer belt 162. Separating the secondary transfer roller 166 from the intermediate transfer belt 162 prevents toner from adhering to the secondary transfer roller 166 while the gradation pattern on the intermediate transfer belt 162 passes through a secondary transfer position. As a result, the above-described configuration can prevent so-called backside contamination in which the toner attached to the secondary transfer roller is transferred to the backside of the sheet to contaminate the backside of the sheet while the toner image on the intermediate transfer belt is secondarily transferred to the sheet.

Specifically, as illustrated in FIGS. 8A and 8B, the contact and separation mechanism 210 includes holding arms 211 holding the secondary transfer roller 166, contact and separation cams 212, a camshaft 213, a driver 214, and springs 215. While the full color toner image on the intermediate transfer belt 162 is secondarily transferred to the sheet P, the springs 215 press the secondary transfer roller 166 against the intermediate transfer belt 162, and the secondary transfer roller 166 contacts the intermediate transfer belt 162. At the start timing of the process control, the controller 90 controls the driver 214 to rotate the camshaft 213. A time to rotate the camshaft 213 is experimentally determined and stored in the ROM of the controller 90. Rotating the camshaft 213 rotates the contact and separation cams 212. As illustrated in FIG. 9, rotating the contact and separation cams 212 moves the holding arms 211 to separate the secondary transfer roller 166 from the intermediate transfer belt 162. Subsequently, the controller 90 controls the image forming units 121Y, 121C, 121M, and 121Bk and the exposure device 140 to form the image adjustment patterns and the scraping patterns on the intermediate transfer belt 162. At the end timing of the process control after the adjustment patterns and the scraping patterns pass through the secondary transfer position, the controller 90 controls the driver 214 to rotate the camshaft 213 and the contact and separation cams 212, move the holding arms 211, and bring the secondary transfer roller 166 into contact with the intermediate transfer belt 162. The controller 90 may determine the end timing of the process control based on the signals of the adjustment patterns output by the optical sensors 40F, 40C, and 40R.

A mother component of the toner, silica or titanium oxide added to the toner, and other so-called external additives of the toner are transferred from the photoconductor to the intermediate transfer belt 162. The external additives of the toner transferred to the intermediate transfer belt 162 may adhere to the intermediate transfer belt 162 and cause filming on the intermediate transfer belt 162. If the printer 100 includes the lubrication device to apply the lubricant to the surface of the photoconductors 10Y, 10M, 10C, and 10Bk, various components included in the lubricant are also transferred from the photoconductors 10Y, 10M, 10C, and 10Bk to the intermediate transfer belt 162 in addition to the external additives of the toner. The external additives of the toner and the lubricant may interact with each other and worsen the filming on the intermediate transfer belt 162. Further, paper dust may be transferred from the sheet P to the intermediate transfer belt 162 at the secondary transfer nip and may adhere to the intermediate transfer belt 162, resulting in paper dust filming.

Such filming on the intermediate transfer belt 162 is caused by filming substances, such as the external additives of the toner including silica and various components included in the lubricant, adhering to the intermediate transfer belt 162 when the intermediate transfer belt 162 receives external pressure (for example, contact pressure from the photoconductor). The occurrence of the filming on the intermediate transfer belt 162 causes the occurrence of abnormal images such as white spots in a full solid image or a halftone image that are output because toner is not on a portion of the intermediate transfer belt 162 in which the filming occurs.

In addition, the filming decreases the glossiness of the intermediate transfer belt 162. As a result, the filming that occurs in areas of the intermediate transfer belt 162 facing the optical sensors 40R, 40C, and 40F changes the output signals, and the optical sensors 40R, 40C, and 40F fail to favorably detect the adhesion amounts of the gradation patterns on the intermediate transfer belt 162. Further, the unevenness of the filming makes the output of the optical sensors 40R, 40C, and 40F unstable and hampers correct image adjustment.

The filming may also decrease the cleaning property of the cleaning blade 167*a*. Gradation patterns have relatively large adhesion amounts per unit area and are formed at positions facing the optical sensors 40R, 40C, and 40F. As a result, the cleaning blade 167*a* receives large amounts of toner at positions corresponding to the positions facing the optical sensors 40R, 40C, and 40F. For this reason, the occurrence of filming on areas of the intermediate transfer belt 162 facing the optical sensors 40R, 40C, and 40F is likely to cause cleaning failure (the toner passes through the cleaning area) when the gradation patterns are input to the cleaning blade 167*a*.

The toner staying at an area at which the cleaning blade 167*a* contacts the surface of the intermediate transfer belt 162, which is referred to as a cleaning area in the following description, scrapes the filming and removes the filming from the surface of the intermediate transfer belt 162. Specifically, the uneven surface of the toner staying at the cleaning area and the pressure of the cleaning blade 167*a* applied to the toner scrape off the filming from the surface of the intermediate transfer belt 162.

For this reason, the controller 90 in the printer 100 controls the image forming units to form scraping patterns on the intermediate transfer belt 162 at a given point in time to remove the filming from the intermediate transfer belt 162. The scraping pattern has a long band shape extending in the width direction of the intermediate transfer belt 162. The scraping pattern is input to the cleaning blade 167*a* so that a sufficient amount of toner stays in the cleaning area.

In the related art, the controller estimates a filming state based on a travel distance of the intermediate transfer belt 162 and controls the image forming unit and the exposure device to form the scraping pattern, for example, on a sheet interval area after the controller determines that the filming state of the intermediate transfer belt 162 becomes a predetermined state. The sheet interval area is an area on the intermediate transfer belt 162. When a first sheet and a second sheet pass through the secondary transfer nip and contact the intermediate transfer belt, the sheet interval area is between an area in which the first sheet contacts the intermediate transfer belt and an area in which the second sheet contacts the intermediate transfer belt. At this time, if the controller controls the contact and separation mechanism to separate the secondary transfer roller from the intermediate transfer belt while the scraping pattern passes through the secondary transfer position to prevent the toner of the scraping pattern from adhering to the secondary transfer roller, such a control enlarges the sheet interval area and reduces the productivity. To avoid the above disadvantage, the controller in the related art controls a power source to apply a bias having a polarity opposite to that of the secondary transfer bias to the opposed roller 164 while the scraping pattern passes through the secondary transfer nip, so that the scraping pattern is not transferred to the secondary transfer roller. However, the toner in the scraping pattern includes reversely charged toner charged to the polarity (the positive polarity) opposite to the normal charging polarity (the negative polarity), and the reversely charged toner may be electrostatically transferred to the secondary transfer roller. In addition, the secondary transfer roller may mechanically scrape off a part of the toner of the scraping pattern, and the toner may mechanically adhere to the secondary transfer roller. In particular, increasing an amount of toner of the scraping pattern to satisfactorily remove the filming on the intermediate transfer belt in the image forming apparatus having a high image forming speed increases an amount of toner adhering to the secondary transfer roller as described below. As a result, the backside of the sheet may be contaminated.

In addition, increasing the image forming speed to increase the productivity raises the temperature in the image forming apparatus, which worsens the filming on the intermediate transfer belt 162. As described above, the sufficient amount of toner staying in the cleaning area can favorably remove the filming on the surface of the intermediate transfer belt. Even in the image forming apparatus having the high image forming speed, the sufficient amount of toner staying in the cleaning area can preferably prevent the occurrence of the disadvantage caused by the filming on the intermediate transfer belt over time. However, elongating the scraping pattern in the moving direction of the intermediate transfer belt 162, which is referred to as a belt moving direction in the following description, to increase the amount of toner in the scraping pattern may cause the toner to slip through the cleaning blade, and cleaning failure may occur.

Figure 3A:
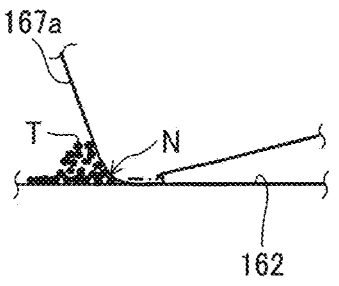
FIGS. 3A to 3C are schematic diagrams illustrating cleaning failure caused by a scraping pattern having a large amount of toner.
Figure 3B:
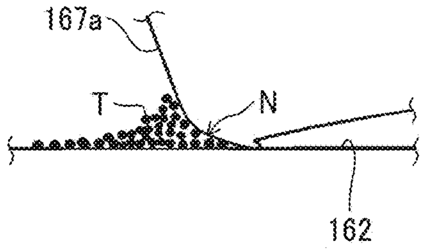
Figure 3C:
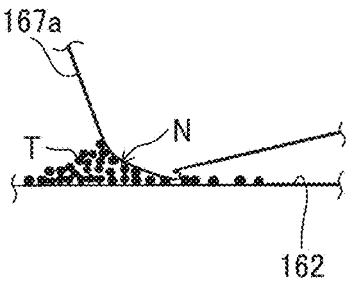

FIGS. 3A to 3C are schematic diagrams illustrating cleaning failure caused by the scraping pattern having a large amount of toner.

When the scraping pattern is input to the cleaning area that is a contact portion at which the cleaning blade 167*a* is in contact with the intermediate transfer belt 162, the cleaning blade 167*a* blocks toner T of the scraping pattern as illustrated in FIG. 3A. The blocked toner of the scraping pattern generates force, and the force deforms the tip of the cleaning blade 167*a* in the belt moving direction to form a wedge-shaped space N between the intermediate transfer belt 162 and the cleaning blade 167*a*. The toner T enters the wedge-shaped space N, is pressed against the intermediate transfer belt 162, and removes the filming on the intermediate transfer belt 162.

After the wedge-shaped space N is formed as illustrated in FIG. 3A, additionally inputting the toner of the scraping pattern to the cleaning area gradually increases the force of the blocked toner applied to the tip of the cleaning blade 167*a*. As a result, the force further deforms the tip of the cleaning blade 167*a* in the belt moving direction and gradually enlarges the wedge-shaped space N. As the wedge-shaped space Nis expanded, the amount of toner entering the wedge-shaped space N increases, which enhances the effect of removing filming.

However, when the amount of toner in the scraping pattern is large, further continuing to input the toner to the cleaning area after the wedge-shaped space N is expanded as illustrated in FIG. 3B further increases the force generated by the blocked toner and applied to the tip of the cleaning blade 167*a*. As a result, the force further deforms the tip of the cleaning blade 167*a* in the belt moving direction, and the toner passes through the cleaning area, so that the cleaning failure occurs as illustrated in FIG. 3C.

In the present embodiment, the following solves the above-described problems, that is, the backside contamination of the sheet and preventing both the cleaning failure and the disadvantage caused by the filming. In order to solve the backside contamination of the sheet, the controller forms the scraping pattern while the controller performs the process control in which the controller controls the contact and separation mechanism to separate the secondary transfer roller 166 from the intermediate transfer belt 162. In order to prevent both the cleaning failure and the disadvantage caused by the filming, the controller controls the image forming unit and the exposure device to form multiple scraping patterns arranged at predetermined intervals. The following describes features of the present embodiment with reference to the drawings.

Figure 4A:
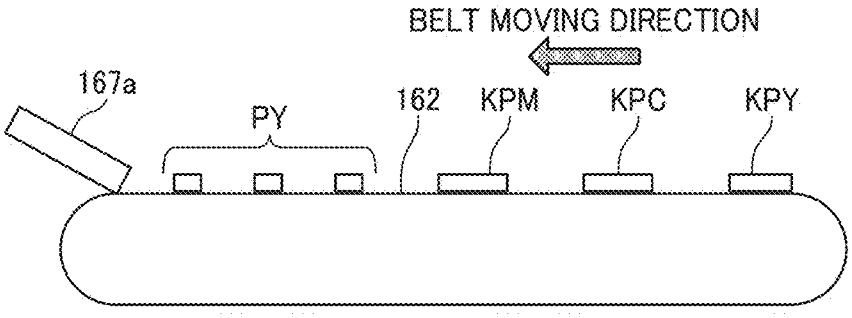
FIGS. 4A and 4B are schematic diagrams illustrating a part of gradation patterns and scraping patterns that are formed on an intermediate transfer belt while a controller performs process control.
Figure 4B:
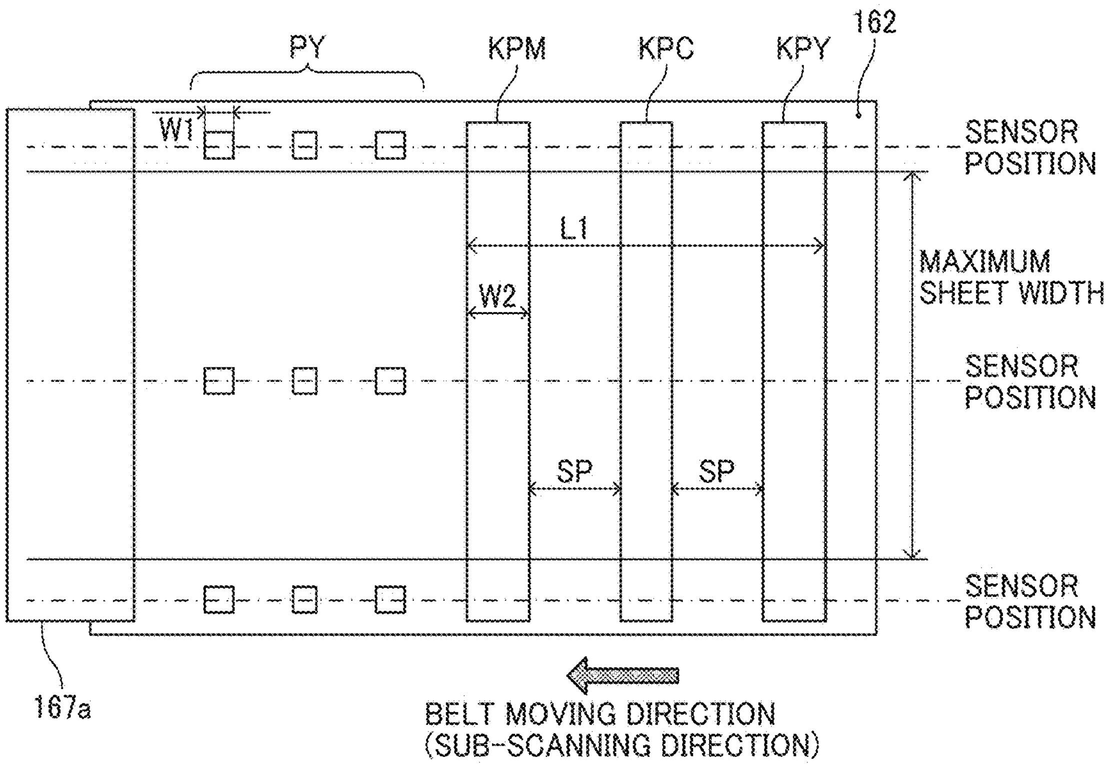

FIGS. 4A and 4B are schematic diagrams illustrating a part of gradation patterns and scraping patterns KP that are formed on the intermediate transfer belt 162 while the controller performs the process control.

As illustrated in FIGS. 4A and 4B, the controller in the present embodiment controls the image forming units and the exposure device to firstly form the gradation patterns as the adjustment patterns, and secondly form the three scraping patterns. The three scraping patterns are solid images, have the band shapes, and arranged at predetermined intervals on the intermediate transfer belt 162.

As described above, the controller controls the contact and separation mechanism to separate the secondary transfer roller 166 from the intermediate transfer belt 162 and controls the image forming units and the exposure device to form the gradation patterns on the intermediate transfer belt while the controller performs the process control. The controller controls the image forming units and the exposure device to form the scraping patterns KP after the gradation patterns are formed and controls the contact and separation mechanism so as to continue to separate the secondary transfer roller 166 from the intermediate transfer belt 162 until the scraping patterns KP pass through the secondary transfer position. The above-described control prevents the toner of the multiple toner patches of the gradation patterns and the toner of the scraping patterns KP from adhering to the secondary transfer roller 166 and prevents the occurrence of the backside contamination of the sheet.

Forming the scraping patterns KP during the execution of the process control can reduce the number of times of occurrence of downtime in the image forming apparatus compared with the image forming apparatus in which the controller forms scraping patterns at a timing different from the timing performing the process control.

Forming the scraping patterns KP during the execution of the process control enables the gradation patterns and the scraping patterns KP to pass through the secondary transfer position without contacting the secondary transfer roller 166 by one operation that separates the secondary transfer roller from the intermediate transfer belt. As a result, the total downtime of the image forming apparatus can be reduced as compared with the image forming apparatus in which the controller forms scraping patterns at the timing different from the timing performing the process control.

As illustrated in FIG. 4B, each of the scraping patterns KP has a long band shape extending in the width direction of the intermediate transfer belt 162 and is longer than the maximum width of the sheets that is the largest width of widths of sheets that can be conveyed by the printer 100. The printer 100 includes the optical sensors 40R and 40F that are disposed to face both ends of the intermediate transfer belt 162 in the width direction. The scraping pattern KP includes the areas of the intermediate transfer belt 162 facing the optical sensors 40R and 40F. The above-described configuration can satisfactorily remove the filming on the maximum width region of the intermediate transfer belt 162 in which the toner image to be transferred to the sheet P is formed and prevent the occurrence of the abnormal image such as the white spot.

In addition, the scraping pattern KP includes the areas of the intermediate transfer belt 162 facing the optical sensors 40R and 40F that are disposed to face both ends of the intermediate transfer belt 162 in the width direction. As a result, the cleaning blade can satisfactorily remove the filming on the areas of the intermediate transfer belt 162 facing the optical sensors 40R and 40F, and the optical sensors 40R and 40F can satisfactorily detect amounts of toner adhered to both ends of the intermediate transfer belt 162.

If a length W2 of the scraping pattern KP in the belt moving direction is shorter than a length W1 of the toner patch in the belt moving direction, the amount of toner input to the cleaning area at a time is small, and the force generated by the toner staying in the cleaning area and applied to the tip of the cleaning blade 167*a* becomes insufficient. As a result, the wedge-shaped space N illustrated in FIG. 3B is not formed, and the filming on the surface of the intermediate transfer belt may not be removed well.

Setting the length W2 of the scraping pattern KP in the belt moving direction to be longer than the length W1 of the toner patch in the belt moving direction as in the present embodiment can set the amount of toner of the scraping pattern KP to be equal to or larger than the amount of toner that deforms the tip of the cleaning blade in the belt moving direction. As a result, the wedge-shaped space N is formed, and the toner of the scraping pattern input to the cleaning area can satisfactorily remove the filming on the surface of the intermediate transfer belt.

The length W2 of the scraping pattern KP in the belt moving direction is set so that the amount of toner in the scraping pattern is less than the amount of toner at which the cleaning failure does not occur. In the present embodiment, setting the length W2 of the scraping pattern KP in the belt moving direction to be equal to or smaller than 80 mm enables the amount of toner of the scraping pattern KP to be less than the amount of toner at which the cleaning failure does not occur, which is described below by verification experiments.

If an interval Sp between the scraping patterns KP in FIG. 4B is too short, inputting the scraping pattern to the cleaning area and subsequently inputting the next scraping pattern to the cleaning area results in the amount of toner remaining in the cleaning area to be the sum of the amount of toner of the next scraping pattern and the amount of remaining toner that is not removed and remains in the cleaning area, which may cause the amount of toner remaining in the cleaning area to be equal to or greater than the amount of toner at which the cleaning failure occurs. Therefore, the interval Sp is set to be a predetermined value or more. In the present embodiment, setting the interval Sp between the scraping patterns KP in the belt moving direction to be equal to or greater than at least 80 mm can avoid the occurrence of the cleaning failure, which is described below by the verification experiments.

By contrast, if the interval Sp is too long, the toner of the preceding scraping pattern KP is completely removed from the cleaning area, and the wedge-shaped space N disappears, which may interrupt removing the filming. As a result, the filming may be unevenly removed. In addition, the too long interval Sp increases the length LI from the first scraping pattern to the last scraping pattern in FIG. 4B. As a result, a time to execute the process control increases, which increases the downtime of the image forming apparatus. For these reasons, the interval Sp is preferably as short as possible and the predetermined value (that is 80 mm) or longer at which the cleaning failure does not occur. In other words, the interval Sp is preferably close to the predetermined value (80 mm). Setting the interval Sp as described above can prevent the occurrence of the cleaning failure, uniformly and satisfactorily remove the filming on the intermediate transfer belt and prevent the time to execute the process control from increasing.

Figure 5A:
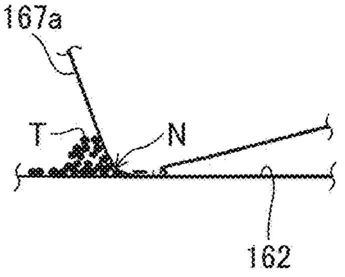
FIGS. 5A to 5C are schematic diagrams illustrating a cleaning area to which a scraping pattern of the present embodiment is input and a tip of a cleaning blade.
Figure 5B:
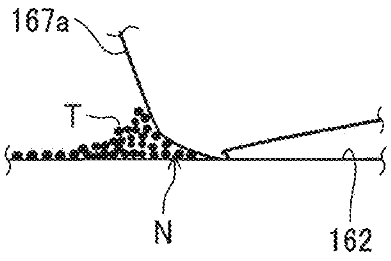
Figure 5C:
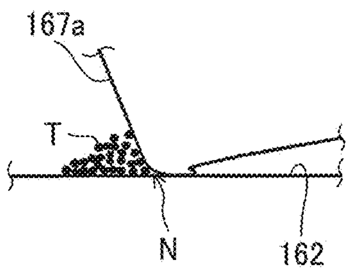

FIGS. 5A to 5C are schematic diagrams illustrating the cleaning area to which the scraping pattern KP of the present embodiment is input and the tip of the cleaning blade 167*a*.

As illustrated in FIGS. 5A and 5B, when the scraping pattern KP is input to the cleaning area, the toner is blocked by the tip of the cleaning blade 167*a* to generate the force, and the force deforms the tip of the cleaning blade 167*a* in the belt moving direction. The deformation of the tip of the cleaning blade 167*a* in the belt moving direction forms the wedge-shaped space N, and the toner enters the wedge-shaped space N and satisfactorily removes the filming on the intermediate transfer belt 162.

The length W2 of the scraping pattern according to the present embodiment in the belt moving direction is shorter than that of a pattern according to the related art, and the toner amount of the scraping patterns is smaller than that of the pattern according to the related art. For this reason, the amount of toner input to the cleaning area is prevented from increasing after the toner is input to the cleaning area as illustrated in FIG. 5B. This prevents the tip of the cleaning blade 167*a* from further deforming in the belt moving direction. As a result, the deformation of the tip of the cleaning blade 167*a* can be maintained to be a level at which the toner does not pass through the cleaning blade, and the occurrence of the cleaning failure can be prevented.

After the scraping pattern is input to the cleaning area, the toner staying in the cleaning area is gradually removed from the intermediate transfer belt 162 to reduce the force of the toner applied to the tip of the cleaning blade 167*a*. As a result, the tip of the cleaning blade gradually returns to the initial shape by the restoring force of the cleaning blade, and the wedge-shaped space N gradually decreases as illustrated in FIG. 5C to return to the state illustrated in FIG. 5A.

Subsequently, before the toner forming the preceding scraping pattern KP is completely removed from the cleaning area and the wedge-shaped space N disappears, the next scraping pattern KP is input to the cleaning area. As a result, the toner can continuously and uniformly remove the filming on the intermediate transfer belt 162.

In the present embodiment, forming multiple scraping patterns KP at predetermined intervals enables the amount of toner in each scraping pattern KP to set to the amount of toner at which the cleaning failure does not occur, and adjusting the number of scraping patterns KP enables the amount of toner input to the cleaning blade 167*a* to set to the amount of toner that can satisfactorily remove the filming on the intermediate transfer belt 162. Forming the scraping patterns as described above can prevent the occurrence of the cleaning failure and satisfactorily remove the filming on the intermediate transfer belt 162.

As described above, in the present embodiment, the amount of toner in each scraping pattern KP and the interval Sp between the scraping patterns KP are adjusted so that the cleaning failure does not occur. However, for example, change in the environment in which the image forming apparatus is used or using the image forming apparatus for a long time may change the contact pressure by which the cleaning blade 167*a* is pressed against the intermediate transfer belt 162 to deteriorate the cleaning performance and cause a slight cleaning failure.

If the scraping pattern KP is formed before the gradation patterns are formed, the above-described slight cleaning failure may affect and reduce the accuracy of the detection performed by the optical sensors 40F, 40C, and 40R that detect the amounts of toner adhering to the toner patches. Specifically, there is a risk that the optical sensor detects a larger amount of toner adhering to the toner patch than the real amount of toner adhering to the toner patch. As a result, the image density after the image density adjustment based on the erroneously detected amount of toner adhering to the toner patch may be lower than the target image density.

By contrast, the scraping pattern in the present embodiment is formed after the gradation patterns are formed. So, even if the slight cleaning failure occurs, the slight cleaning failure does not affect the detection of the amount of toner adhering to the toner patch. As a result, the optical sensors 40F, 40C, and 40R can accurately detect the amount of toner adhering to the toner patch.

In the present embodiment, three scraping patterns are formed by different color toners as illustrated in FIGS. 4A and 4B. Forming scraping patterns with different color toners prevents the specific color toner from being consumed.

In addition, the scraping pattern located on the most downstream portion of the intermediate transfer belt 162 in the belt moving direction is formed by the magenta toner, the center scraping pattern of the three scraping patterns is formed by the cyan toner, and the scraping pattern located on the most upstream portion of the intermediate transfer belt 162 in the belt moving direction is formed by the yellow toner, which follows the order in which the image forming units 121Y, 121C, 121M, and 121Bk illustrated in FIG. 1 forms the magenta toner image, cyan toner image, and the yellow toner image. The above-described order of the colors of the scraping patterns follows the order in which the image forming units 121Y, 121C, 121M, and 121Bk form the color toner images from a downstream portion to an upstream portion on the intermediate transfer belt in the belt moving direction. This can shorten a time to form the three scraping patterns.

Alternatively, three scraping patterns may be formed on the intermediate transfer belt 162 in the order of a black toner pattern, a magenta toner pattern, and a cyan toner pattern. The above-described configuration can shorten a time to form the three scraping patterns including the black toner pattern, the cyan toner pattern, and the yellow toner pattern. For example, the time to form the three scraping patterns including the black toner pattern, the magenta toner pattern, and the cyan toner pattern is shorter than a time to form three scraping patterns including a black toner pattern, a cyan toner pattern, and a magenta toner pattern and not including the magenta toner pattern. The time to form the three scraping patterns is defined as a time from when one of the three image forming units starts the series of image forming processes to when the last one of the three image forming units finishes the series of image forming processes. The series of image forming processes starts when the charging device 11 starts uniformly charging the surface of the photoconductor and ends when the toner image is primarily transferred from the photoconductor to the intermediate transfer belt.

The following describes verification experiments conducted by the inventors.

Figure 6A:
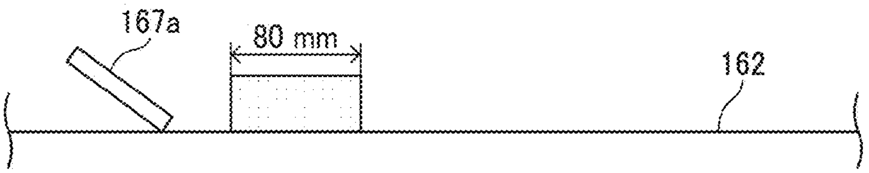
FIGS. 6A to 6C are schematic diagrams illustrating conditions (A) to (C) to form a scraping pattern in verification experiments.
Figure 6B:
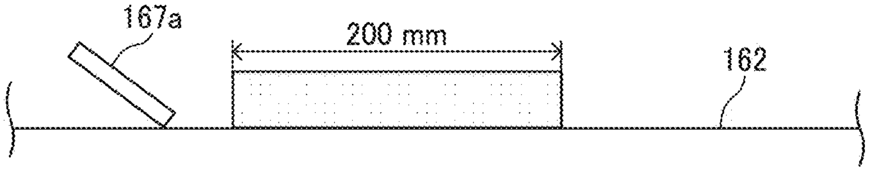
Figure 6C:
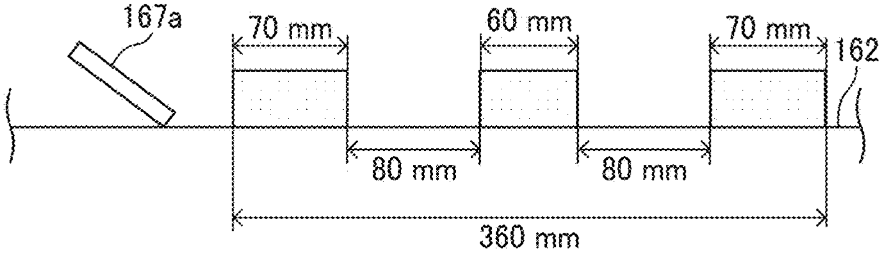

As illustrated in FIGS. 6A to 6C, the inventors performed verification experiments under conditions (A) to (C) in which the length of the scraping pattern in the belt moving direction and the number of scraping patterns were different from each other.

In the condition (A), one scraping pattern KP that is a solid image having a length of 80 mm in the belt moving direction was formed. In the condition (B), one scraping pattern KP that is a solid image having a length of 200 mm in the belt moving direction was formed. In the condition (C), three scraping patterns KP that are solid images having lengths of 70 mm, 60 mm, and 70 mm, respectively in the belt moving direction were formed at an interval of 80 mm. Under the conditions (A) to (C), the cleaning performance and the filming were evaluated.

The cleaning performance was evaluated as follows.

A cleaning blade contact pressure was set to be 20 N/m.

The linear speed of the intermediate transfer belt was set to be 300 mm/s.

The cleaning performance was evaluated based on an image printed after the scraping pattern KP was formed. When the abnormal image due to the cleaning failure that is streaks was not found in the printed image, the cleaning performance was evaluated as "Good." When the abnormal image due to the cleaning failure that is streaks was found in the printed image, the cleaning performance was evaluated as "Poor."

The filming was evaluated as follows.

The printer printed the same images each having an image area rate of 5% on 150,000 sheets and formed test patterns on the intermediate transfer belt. The optical sensors 40R, 40C, and 40F detected amounts of toner in the test patterns. The filming hampers the optical sensor from normally detecting the amount of toner, and an error message is displayed on an operation panel. If the error message was not displayed when the optical sensors 40R, 40C, and 40F detected the amounts of toner in the test patterns, the filming was evaluated as "No problem." If the error message was displayed when the optical sensors 40R, 40C, and 40F detected the amounts of toner in the test patterns, the filming was evaluated as "Bad." The scraping pattern KP was formed when performing the process control.

The results of the verification experiments are illustrated in Table 1 below.

TABLE 1

| CONDITION | CLEANING PERFORMANCE | FILMING |
|---|---|---|
| A | Good | Bad |
| B | Poor | No problem |
| C | Good | No problem |

As illustrated in Table 1, the cleaning performance was evaluated as "Good" under the condition (A), but the filming was evaluated as "Bad" under the condition (A). The present inventors consider that this is because the amount of toner in the scraping pattern input to the cleaning area at a time under the condition (A) was small. Therefore, the toner did not pass through the cleaning blade. As a result, the cleaning performance was evaluated as "Good." On the other hand, under the condition (A), the filming was evaluated as "Bad."

As illustrated in Table 1, the cleaning performance was evaluated as "Poor" under the condition (B) in which one scraping pattern KP having a length of 200 mm or more in the belt moving direction was formed. The present inventors consider that this is because inputting a large amount of toner to the cleaning area at a time generates the force, and the force greatly deforms the tip of the cleaning blade 167*a* in the belt moving direction as illustrated in FIG. 3C. As a result, the toner slipped through the tip of the cleaning blade 167*a*, and thus the streaky abnormal image was generated.

On the other hand, under the condition (B), the filming was evaluated as "No problem." The present inventors consider that this is because a large amount of toner input to the cleaning blade 167*a* causes a certain amount of toner or more to stay in the cleaning area for a long time, and the wedge-shaped space N was maintained for a long time. As a result, it is considered that the filming on the intermediate transfer belt 162 can be prevented over time, which results in the filming evaluation of "No problem."

Based on the results under the conditions (A) and (B), the present inventors found that setting the length of the scraping pattern KP in the belt moving direction to be equal to or smaller than at least 80 mm can prevent the occurrence of the cleaning failure. In addition, the present inventors found that setting the length of the scraping pattern KP in the belt moving direction to be equal to or longer than 200 mm can prevent the occurrence of the disadvantage caused by the filming on the intermediate transfer belt 162 over time.

As illustrated in Table 1, under the condition (C), the cleaning performance was evaluated as "Good," and the filming was evaluated as "No problem." The present inventors consider that this is because the scraping patterns KP having the length of 80 mm or less in the belt moving direction can set the amount of toner input to the cleaning area at a time to be less than the amount of toner at which the cleaning failure occurs, and the cleaning blade can satisfactorily block the toner in the cleaning area.

In addition, under the condition (C), three scraping patterns were formed with an interval of 80 mm. Thus, it was confirmed that setting the interval between the scraping patterns to be at least equal to or larger than 80 mm and setting the interval to be larger than the length of the scraping pattern in the belt moving direction (that is equal to or smaller than 80 mm) can set the amount of toner staying in the cleaning area when the next scraping pattern is input to the cleaning area to be less than the amount of toner at which the cleaning failure occurs. As a result, the cleaning failure did not occur.

Additionally, setting the interval between the scraping patterns KP to be at least 80 mm enables the next scraping pattern KP to be input to the cleaning area before the cleaning blade 167*a* completely removes the toner in the cleaning area and eliminates the wedge-shaped space N. Thus, the toner in the cleaning area can continue to scrape the filming. In the condition (C), the sum of the lengths of the three scraping patterns in the belt moving direction is 200 mm, which is the same as that in the condition (B). Since the amount of toner input to the cleaning area under the condition (C) is the same as the amount of toner input to the cleaning area under the condition (B), the toner in the cleaning area can satisfactorily remove the filming on the intermediate transfer belt 162 similarly to the condition (B). Therefore, it is considered that the filming was evaluated as "No problem."

As described above, it was found that forming the multiple scraping patterns that satisfy the following conditions can prevent the occurrence of the cleaning failure and satisfactorily remove the filming on the intermediate transfer belt 162. The conditions are as follows. The length of each scraping pattern in the belt moving direction is 80 mm or less, the interval between the scraping patterns is 80 mm, and the sum of the lengths of multiple scraping patterns in the belt moving direction is 200 mm or more.

In the above description, each scraping pattern is a monochrome solid image formed by one color toner. However, the amount of toner in each scraping pattern per unit area may be set to be larger than the amount of toner in the monochrome solid image. The above-described setting enables, for example, the scraping pattern having a length shorter than 70 mm in the belt moving direction to have the amount of toner equivalent to the amount of toner in the scraping pattern formed as the solid image having a length of 70 mm in the belt moving direction. As a result, a length from the first scraping pattern to the third scraping pattern in the belt moving direction can be set shorter than 360 mm in FIG. 6, and the time to execute the process control can be shortened.

Appropriately adjusting the charging bias of the charging device 11, the developing bias of the developing device 12, and the exposure amount of the exposure device 140 can set the amount of toner per unit area in each scraping pattern to be larger than the amount of toner per unit area in the monochrome solid image. Alternatively, forming the scraping pattern with two or more color toners can set the amount of toner per unit area in each scraping pattern to be larger than the amount of toner per unit area in the monochrome solid image formed by one color toner.

The speed forming the filming varies depending on the temperature in the image forming apparatus and the linear speed of the intermediate transfer belt 162. The controller may change the image density of the scraping pattern (in other words, an amount of toner adhering to the unit area of the scraping pattern) in accordance with the speed forming the filming.

For example, the image forming apparatus may include a temperature sensor as a temperature detector that detects the temperature inside the image forming apparatus. The controller may determine whether the temperature detected by the temperature sensor is smaller than a threshold value. When the temperature is lower than the threshold value, the speed forming the filming is slow. The controller may set the image density of the scraping pattern to be lighter than that of the solid image to reduce the amount of toner adhering to the unit area of the scraping pattern. The above-described configuration and control can reduce toner consumption, prevent the occurrence of the cleaning failure, and satisfactorily remove the filming.

In an image forming apparatus having multiple image forming modes that change the linear speed of the intermediate transfer belt 162, the controller may determine whether the image forming mode is a low-speed mode. When the linear speed of the intermediate transfer belt 162 is slow, the speed forming the filming is slow. When the controller determines that the image forming monde is the low-speed mode, the controller may set the image density of the scraping pattern to be lighter than that of the solid image to reduce the amount of toner adhering to the unit area of the scraping pattern. The above-described configuration and control can reduce toner consumption, prevent the occurrence of the cleaning failure, and satisfactorily remove the filming.

The image forming apparatus includes power sources to supply charging voltages to chargers in the charging devices 11. The charger is typically a charging roller. Or, the charger may be a discharge wire of a corotron or a scorotorn. The controller 90 may control the power source to change the charging voltage applied to the charger. Controlling the charging voltage applied to the charger in the charging device 11 changes a charging potential on the photoconductor 10 to change the image density of the scraping pattern. The exposure device does not irradiate the photoconductor with the laser light to form the scraping pattern. Controlling the charging voltage applied to the charger so that the absolute value of the charging potential on the photoconductor is smaller than the absolute value of the developing bias forms a desired developing potential to form the scraping pattern having the band shape. As illustrated in FIG. 7, changing the absolute value of the charging voltage applied to the charger changes the absolute value of the charging potential on the photoconductor, thereby changing the image density of the scraping pattern.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The above-described embodiments are given as examples, and, for example, the following aspects of the present disclosure may have advantageous effects described below.

First Aspect

In a first aspect, an image forming apparatus includes an image forming unit such as the image forming unit 121Y, 121C, 121M, or 121Bk, an image bearer such as the intermediate transfer belt 162, a transferor such as the secondary transfer roller 166, a cleaner such as the cleaning blade 167*a*, a sensor such as the optical sensor 40F, 40C, or 40R, and circuitry such as the controller 90. The image forming unit forms a toner image. The image bearer contacts the image forming unit to bear the toner image. The image bearer is movable in a moving direction. The transferor contacts the image bearer to transfer the toner image from the image bearer to a recording medium such as the sheet. The cleaner contacts the image bearer to clean the surface of the image bearer. The circuitry is configured to control the image forming unit to form multiple toner patches arranged at a first interval on the image bearer in an orthogonal direction orthogonal to the moving direction and control the sensor to detect the multiple toner patches. The circuitry is configured to adjust the image forming unit based on a detection of the multiple toner patches by the sensor as an adjustment operation. The circuitry is configured to separate the transferor from the image bearer during the adjustment operation and control the image forming unit to form multiple patterns arranged at a second interval in the moving direction. Each of the multiple patterns has a band shape extending in the orthogonal direction.

Increasing the linear speed of the image bearer such as the intermediate transfer belt 162 to enhance productivity increases the temperature inside the image forming apparatus, which is likely to increase the filming on the image bearer. Increasing the length of the pattern having the band shape such as the scraping pattern KP in the moving direction of the image bearer to increase the amount of toner of the pattern increases the amount of toner input to the cleaner, which can enhance the effect of removing the filming. As a result, increasing the length of the pattern can satisfactorily remove the filming even in the image forming apparatus including the image bearer moved by a high linear speed. However, increasing the amount of toner of the pattern means inputting a large amount of toner to the cleaner at a time, which increases the amount of toner blocked by the cleaner. Increasing the amount of toner blocked by the cleaner increases a pressure applied to the cleaner by the toner blocked. The toner may pass through a contact portion at which the cleaner contacts the image bearer, which may cause the cleaning failure. As a result, both of preventing the occurrence of the cleaning failure and satisfactorily removing the filming from the image bearer may not performed.

To avoid the above disadvantage, the controller in the related art controls a power source to apply a bias having a polarity opposite to that of a transfer bias to a transfer nip while the pattern having the band shape passes through the transfer nip, so that the pattern is not transferred to the secondary transfer roller. However, the toner in the pattern having the band shape includes reversely charged toner charged to the polarity opposite to the normal charging polarity, and the reversely charged toner may be electrostatically transferred to the transferor while the pattern passes through the transfer nip. In addition, the transferor may mechanically scrape off a part of the toner of the pattern having the band shape, and the toner may mechanically adhere to the transferor.

In the first aspect, forming the multiple patterns having the band shape to be arranged at a predetermined interval enables the amount of toner in the pattern to set not to cause the cleaning failure and enables the number of the patterns to set the amount of toner input to the cleaner to an amount corresponding to the filming on the image bearer. In addition, since the above-described control forms the multiple patterns at predetermined intervals in the moving direction of the image bearer, the above-described control enables the cleaner to block and remove a certain amount of toner of the pattern from the surface of the image bearer to reduce the toner of the pattern blocked by the cleaner to some extent and then input the next pattern to the cleaner. As a result, the amount of toner blocked by the cleaner is prevented from reaching the amount of toner that causes the cleaning failure. As a result, both of preventing the occurrence of the cleaning failure and satisfactorily removing the filming from the image bearer can be performed.

In addition, forming the multiple patterns having the bans shapes during the adjustment operation and separating the transferor from the image bearer during the adjustment operation can prevent the toner in the multiple toner patches and the multiple patterns from adhering to the transferor. As a result, the occurrence of the backside contamination of the sheet can be prevented. The number of occurrence of downtime of the image forming apparatus can be reduced as compared with the image forming apparatus in which the controller forms the patterns having the band shapes at the timing different from the timing performing the adjustment operation.

Second Aspect

In a second aspect, each of the multiple patterns such as the scraping patterns KP in the moving direction has a length longer than a length of each of the multiple toner patches in the moving direction in the image forming apparatus according to the first aspect.

Since the amount of toner in the pattern longer than the toner patch in the moving direction is larger than the amount of toner in the pattern shorter than the toner patch in the moving direction, the pattern longer than the toner patch can input the amount of toner that enhance the effect of removing the filming to the cleaner.

Third Aspect

In a third aspect, the image forming apparatus according to the first aspect or the second aspect further includes multiple image forming units such as the image forming units 121Y, 121C, 121M, and 121Bk including the image forming unit. The multiple image forming units are arranged in the moving direction of the image bearer such as the intermediate transfer belt 162. The multiple image forming units contain different color toners. The circuitry is further configured to control the multiple image forming units to form the multiple patterns having different colors such as the scraping patterns KP.

According to the third aspect, as described with the embodiments, forming the multiple patterns such as the scraping patterns KP by different color toners prevents the specific color toner from being consumed compared with forming the multiple patterns by one color toner.

Fourth Aspect

In a fourth aspect, the circuitry in the image forming apparatus according to the third aspect is further configured to control the multiple image forming units such as the image forming units 121Y, 121C, 121M, and 121Bk to form the multiple patterns such as the scraping patterns having colors arranged from downstream to upstream in a first order in the moving direction, and the different color toners in the multiple image forming units are arranged from downstream to upstream in a second order coincides with the first order in the moving direction.

According to the fourth aspect, as described in the embodiment, a time to form the multiple patterns such as the multiple scraping patterns KP can be shortened.

Fifth Aspect

In a fifth aspect, the second interval between the multiple patterns in the image forming apparatus according to any one of the first to fourth aspects is longer than a length of each of the multiple patterns in the moving direction.

According to the fifth aspect, as described in the embodiment, the interval set as described above can prevent the amount of toner staying in the cleaning area from reaching the amount of toner that causes the cleaning failure when the next pattern such as the scraping pattern is input to the cleaning area.

Sixth Aspect

In a sixth aspect, the circuitry in the image forming apparatus according to any one of the first to fifth aspects is configured to control the image forming unit to change an image density of each of the multiple patterns such as the scraping patterns.

According to the sixth aspect, as described in the embodiment, the circuitry such as the controller 90 can adjust the amount of toner in the patterns such as the scraping patterns in accordance with the speed forming the filming, which prevents the occurrence of the disadvantage caused by the filming and prevents the toner consumption amount from increasing.

Seventh Aspect

In a seventh aspect, each of the multiple patterns such as the scraping patterns KP has a length equal to or longer than the maximum width of the recording media usable in the image forming apparatus according to any one of the first to sixth aspects in the orthogonal direction.

According to the seventh aspect, as described in the embodiment, the occurrence of the abnormal image caused by the filming, such as the white spot in the image formed on the recording medium such as the sheet P can be satisfactorily prevented.

Eighth Aspect

In an eighth aspect, the image forming apparatus according to any one of the first to seventh aspects further includes two sensors such as the optical sensors including the sensor. The two sensors are disposed to face both ends of the image bearer such as the intermediate transfer belt 162 in the orthogonal. A first length of each of the multiple patterns such as the scraping patterns KP is equal to or longer than a second length between the two sensors in the orthogonal direction.

According to the eighth aspect, as described in the embodiment, the occurrence of the abnormal image such as the white spot in the image formed on the recording medium such as the sheet P can be satisfactorily prevented. In addition, the filming on the areas of the image bearer facing the sensors such as the optical sensors 40R and 40F disposed so as to face both ends of the image bearer can be satisfactorily removed, and the sensors can satisfactorily detect amounts of toner in the toner patches.

Ninth Aspect

In a ninth aspect, the circuitry such as the controller 90 in the image forming apparatus according to the first to eighth aspects is further configured to control the image forming unit to form the multiple patterns following the multiple toner patches on the image bearer.

According to the ninth aspect, as described in the embodiment, the sensor such as the optical sensor can satisfactorily detect toner patches even if the pattern such as the scraping pattern causes a slight cleaning failure because the slight cleaning failure does not affect the toner patches of the gradation pattern.

Tenth Aspect

In a tenth aspect, an amount of toner adhering to a unit area of each of the multiple patterns such as the scraping patterns KP in the image forming apparatus according to any one of the first to ninth aspects is larger than an amount of toner adhering to a unit area of a monochrome solid image.

According to the tenth aspect, as described in the embodiment, the length of the pattern such as the scraping pattern in the moving direction can be set to be shorter than the length of the pattern that is the monochrome solid image formed by the one color toner, and the amount of toner can be set to be equal to the amount of toner of the pattern that is the monochrome solid image. As a result, the length from the most downstream pattern in the moving direction to the most upstream pattern in the moving direction can be set to be shorter than the length from the most downstream pattern that is the monochrome solid image in the moving direction to the most upstream pattern that is the monochrome solid image in the moving direction. Thus, the time to perform the adjustment operation such as the process control can be shortened.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The invention claimed is:

1. An image forming apparatus comprising:

an image forming unit to form a toner image;

an image bearer contacting the image forming unit to bear the toner image, the image bearer movable in a moving direction;

a transferor contacting the image bearer to transfer the toner image from the image bearer to a recording medium;

a cleaner contacting the image bearer to clean a surface of the image bearer;

a sensor; and circuitry configured to:

control the image forming unit to form multiple toner patches arranged at a first interval on the image bearer in an orthogonal direction orthogonal to the moving direction, at least one of the multiple toner patches being outside a maximum width of the recording medium usable in the image forming apparatus in the orthogonal direction;

control the sensor to detect the multiple toner patches;

adjust the image forming unit based on a detection of the multiple toner patches by the sensor as an adjustment operation;

separate the transferor from the image bearer during the adjustment operation;

control the image forming unit to form multiple patterns arranged at a second interval in the moving direction based on the transferor being separated from the image bearer, each of the multiple patterns having a band shape extending in the orthogonal direction;

maintain the transferor separate from the image bearer based on the multiple toner patches passing through a transfer position and the multiple patterns passing through the transfer position after the multiple toner patches; and control the image forming unit to cause the multiple patterns to continuously pass through the transfer position after the multiple toner patches pass through the transfer position while the transferor is separated from the image bearer, wherein each of the multiple patterns has a length longer than the maximum width of the recording medium.

2. The image forming apparatus according to claim 1, wherein each of the multiple patterns has a length longer than a length of each of the multiple toner patches in the moving direction.

3. The image forming apparatus according to claim 1, further comprising multiple image forming units including the image forming unit, the multiple image forming units arranged in the moving direction, the multiple image forming units containing different color toners, wherein the circuitry is further configured to control the multiple image forming units to form the multiple patterns having different colors.

4. The image forming apparatus according to claim 3, wherein the circuitry is further configured to control the multiple image forming units to form the multiple patterns having colors arranged from downstream to upstream in a first order in the moving direction, and the different color toners in the multiple image forming units are arranged from downstream to upstream in a second order that coincides with the first order in the moving direction.

5. The image forming apparatus according to claim 1, wherein the second interval between the multiple patterns is longer than a length of each of the multiple patterns in the moving direction.

6. The image forming apparatus according to claim 1, wherein the circuitry is further configured to control the image forming unit to change an image density of each of the multiple patterns.

7. The image forming apparatus according to claim 1, further comprising two sensors including the sensor, the two sensors disposed to face both ends of the image bearer in the orthogonal direction, wherein a first length of each of the multiple patterns is equal to or longer than a second length between the two sensors in the orthogonal direction.

8. The image forming apparatus according to claim 1, wherein the circuitry is further configured to control the image forming unit to form the multiple patterns following the multiple toner patches on the image bearer.

9. The image forming apparatus according to claim 1, wherein an amount of toner adhering to a unit area of each of the multiple patterns is larger than an amount of toner adhering to a unit area of a monochrome solid image.

10. The image forming apparatus according to claim 1, wherein the circuitry is configured to control the cleaner to input the multiple toner patches at a first time and input the multiple patterns at a second time after the first time.

11. The image forming apparatus according to claim 1, wherein the circuitry is configured to control the image forming unit to form the multiple patterns downstream of the multiple toner patches, the multiple patterns being aligned to overlap one another in the moving direction, each of the multiple patterns being formed a different color.

12. The image forming apparatus according to claim 1, wherein the circuitry is configured to control the image forming unit to continuously input the multiple patterns to the cleaner after the multiple toner patches are input to the cleaner.

13. The image forming apparatus of claim 1, wherein the transferor includes a camshaft configured to separate the transferor from the image bearer based on the circuitry.

14. An image forming apparatus comprising:

an image forming unit to form a toner image;

an image bearer contacting the image forming unit to bear the toner image, the image bearer movable in a moving direction;

a transferor contacting the image bearer to transfer the toner image from the image bearer to a recording medium;

a cleaner contacting the image bearer to clean a surface of the image bearer;

a sensor outside a maximum width of the recording medium usable in the image forming apparatus in an orthogonal direction orthogonal to the moving direction; and circuitry configured to:

control the image forming unit to form multiple toner patches arranged at a first interval on the image bearer in the orthogonal direction, at least one of the multiple toner patches being outside the maximum width of the recording medium;

control the sensor to detect the multiple toner patches;

adjust the image forming unit based on a detection of the multiple toner patches by the sensor as an adjustment operation;

separate the transferor from the image bearer during the adjustment operation; and control the image forming unit to form multiple patterns arranged at a second interval in the moving direction, each of the multiple patterns having a band shape extending in the orthogonal direction, wherein each of the multiple patterns has a length longer than the maximum width of the recording medium.

15. The image forming apparatus of claim 14, further comprising a further sensor within the maximum width of the recording medium.

16. The image forming apparatus of claim 15, wherein at least one of the multiple toner patches are within the maximum width of the recording medium.

* * * * *